(12) United States Patent
Carr et al.

(10) Patent No.: US 10,307,969 B2
(45) Date of Patent: *Jun. 4, 2019

(54) 3D PRINTING WITH SMALL GEOMETRIC OFFSETS TO AFFECT SURFACE CHARACTERISTICS

(71) Applicant: Adobe Inc., San Jose, CA (US)

(72) Inventors: Nathan A. Carr, San Jose, CA (US); Tim Christopher Reiner, Fellbach (DE); Gavin Stuart Peter Miller, Los Altos, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/334,527

(22) Filed: Oct. 26, 2016

(65) Prior Publication Data

US 2017/0043532 A1 Feb. 16, 2017

Related U.S. Application Data

(62) Division of application No. 14/155,202, filed on Jan. 14, 2014, now Pat. No. 9,498,919.

(51) Int. Cl.
*B29C 41/02* (2006.01)
*B29C 41/52* (2006.01)
(Continued)

(52) U.S. Cl.
CPC ........ *B29C 67/0055* (2013.01); *B29C 64/106* (2017.08); *B29C 64/112* (2017.08); *B29C 64/118* (2017.08); *B29C 64/20* (2017.08); *B29C 64/386* (2017.08); *B33Y 10/00* (2014.12); *B33Y 30/00* (2014.12); *B33Y 50/02* (2014.12); *B29K 2105/0058* (2013.01)

(58) Field of Classification Search
CPC ....... B29C 41/02; B29C 41/52; B29C 64/118; B29C 64/386; B29C 64/393
USPC ................................................ 264/40.1, 308
See application file for complete search history.

(56) References Cited

U.S. PATENT DOCUMENTS 5,303,141 A   4/1994  Batchelder et al.
5,653,925 A   8/1997  Batchelder
(Continued)

OTHER PUBLICATIONS

"Notice of Allowance", U.S. Appl. No. 14/155,202, dated Jul. 21, 2016, 5 pages.
(Continued)

*Primary Examiner* — Leo B Tentoni
(74) *Attorney, Agent, or Firm* — SBMC

(57) ABSTRACT

This document describes techniques and apparatuses for 3D printing with small geometric offsets to affect surface characteristics. These techniques are capable of enabling fused-deposition printers to create 3D objects having desired surface characteristics, such as particular colors, images and image resolutions, textures, and luminosities. In some cases, the techniques do so using a single filament head with a single filament material. In some other cases, the techniques do so using multiple heads each with different filaments, though the techniques can forgo many switches between these heads. Each printing layer may use even a single filament from one head, thereby enabling surface characteristics while reducing starts and stops for filaments heads, which enables fewer artifacts or increases printing speed.

13 Claims, 10 Drawing Sheets

(51) Int. Cl.
  *B29C 67/00* (2017.01)
  *B29C 64/118* (2017.01)
  *B33Y 10/00* (2015.01)
  *B33Y 30/00* (2015.01)
  *B33Y 50/02* (2015.01)
  *B29C 64/106* (2017.01)
  *B29C 64/112* (2017.01)
  *B29C 64/20* (2017.01)
  *B29C 64/386* (2017.01)
  *B29K 105/00* (2006.01)

(56) References Cited

U.S. PATENT DOCUMENTS

| | | | |
|---|---|---|---|
| 8,827,684 | B1 | 9/2014 | Schumacher et al. |
| 9,498,919 | B2 | 11/2016 | Carr et al. |
| 2014/0048971 | A1 | 2/2014 | Mannella et al. |
| 2015/0197060 | A1 | 7/2015 | Carr et al. |

OTHER PUBLICATIONS

"Pre-Interview Communication", U.S. Appl. No. 14/155,202, dated May 10, 2016, 3 pages.

"Restriction Requirement", U.S. Appl. No. 14/155,202, dated Mar. 3, 2016, 6 pages.

3D PRINTING WITH SMALL GEOMETRIC OFFSETS TO AFFECT SURFACE CHARACTERISTICS

RELATED APPLICATION

This application is a continuation of and claims priority to U.S. patent application Ser. No. 14/155,202 filed Jan. 14, 2014, the disclosure of which is incorporated by reference herein in its entirety.

BACKGROUND

Current techniques for three-dimensional (3D) printing include photopolymerization, granular-materials binding, and fused deposition modeling. In the case of fused deposition modeling, layers of material, such as sugar, plastic, or metal, are extruded, often in the form of small beads that make up strings, also called "filaments." Through extruding layer after layer of these filaments a 3D object is created. These 3D objects can include highly complex designs. In fact, almost anything that a computer can model, a fused-deposition printer can create, from candy art, to a plastic chair, to a metal sculpture.

Current fused-deposition printing techniques, however, often fail to produce desired surface characteristics, such as those having particular colors or image resolutions. This is due in part to many printers being unable to apply short segments of filaments. While many fused-deposition printers have enough filament heads with different-colored filaments to theoretically produce desired surface colors and images, these printers cannot apply different-colored filaments in small enough amounts. Instead, these printers produce surfaces with significant geometric artifacts due to an inability to quickly start and stop the flow of melted filament from their filament heads. Furthermore, even if a fused-deposition printer could quickly start and stop the flow of melted filament, switching back and forth between print heads would cause the total printing time to dramatically increase.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for 3D printing with small geometric offsets to affect surface characteristics. These techniques are capable of enabling fused-deposition printers to create 3D objects having desired surface characteristics, such as particular colors, images and image resolutions, textures, and luminosities. In some cases, the techniques do so using a single filament head with a single filament material. In some other cases, the techniques do so using multiple heads each with different filaments, though the techniques can forgo many switches between these heads. Each printing layer may use even a single filament from one head, thereby enabling surface characteristics while reducing starts and stops for filaments heads, which enables fewer artifacts or increases printing speed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Figure 1:
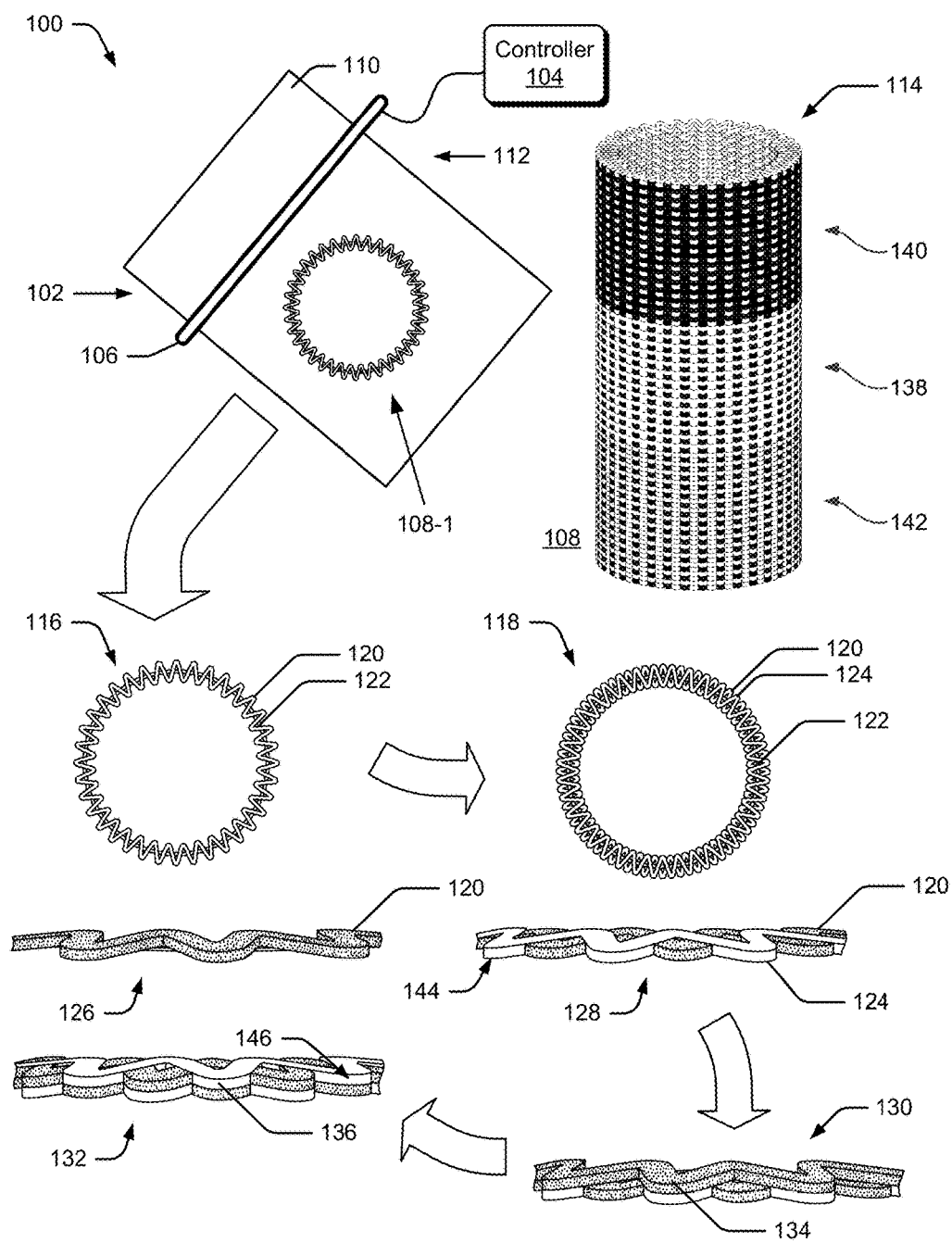
FIG. 1 illustrates an operating environment having a 3D printing device, a controller, and a filament-providing element building a 3D object.

Conventional techniques and apparatuses for three-dimensional (3D) printing are often unable to provide desired surface characteristics for printed objects. This disclosure describes techniques and apparatuses capable of printing desired surface characteristics for objects printed with fused-deposition printers.

Overview

The described techniques enable printing objects with desired surface characteristics, in some cases without requiring sophisticated 3D printers, such as through use of two-tone, dual-head or even monotone, single-head 3D printers.

Consider, for example, a monotone, single-head 3D fused-deposition printer that conventionally is unable to produce much of any desired surface characteristics. These techniques, however, enable even this monotone printer to create objects having a pleasing, almost woven-feeling external surface with sufficient shading to show tonal differences or even images, such as the letters "cat" on a surface of a plastic, 3D printed cat object. The techniques do so using small geometric offsets of filaments at outer bounds of various layers of the printed object. These small geometric offsets can vary tone, texture, and luminosity through occlusion of some filaments at the surface, which is magnified in some cases through newly printed filaments drooping over occluded filaments due to gravity when the newly printed filaments have an appropriate viscosity. In some cases these surface characteristics include the woven-feeling external surface, which also allows a viewing-angle dependency whereby changing the view alters the luminosity of some parts of the surface, which is also pleasing to many users even when this surface may not have been explicitly requested or associated with the object being printed.

Consider also a case where a dual-tone, two-head 3D fused-deposition printer, which conventionally produces poor resolution and color gradients, can be enabled by the techniques to create good image resolution and color grading, with few filament-head switches, even about one per layer in some cases. This resolution and color grading may not even be possible for expensive and complex 3D fused deposition printers without use of the techniques, even with active color mixing and other difficult and time-consuming techniques, and still the techniques enable such resolution and grading with greatly reduced artifacts and higher printing speeds due to few filament-head switches.

In various examples set forth below, the techniques create 3D objects having desired surface characteristics using long contiguous spans of filaments, often one filament per printing layer. In some of these examples, small geometric offsets are created by applying filaments in a sine wave at outer bounds of the layer and, in later layers, reducing or increasing amplitudes of the sine wave, as well as alternating phase of these sine waves for greater color blending and improved surface texture. Alternatively or additionally, in some examples small geometric offsets are created by varying filament size or displacement from an outer bound of the layers.

The following discussion describes an operating environment, techniques that may be employed in the operating environment for 3D printing with small geometric offsets to affect surface characteristics, and a System-on-Chip (SoC) in which component(s) of the operating environment can be embodied. In the discussion below, reference is made to the operating environment by way of example only.

Operating Environment

FIG. 1 illustrates an operating environment 100 that includes a 3D printing device 102 having a controller 104 and a filament-providing group 106. 3D printing device 102 is capable of building a 3D object, shown in the process of being printed over a plate 110 at 108-1 and complete at 3D object 108. Here plate 110 remains fixed while filament-providing group 106 is mechanically advanced, though filament-providing group 106 may instead be moved and plate 110 remain fixed (or both may move). 3D printing device 102 optionally includes sensors 112, which are capable of measuring 3D object 108-1, such as filament locations, angles, luminosities, colors, and widths.

Filament-providing group 106 includes one, two, three, or more filament heads. Filament-providing group 106 can be capable of printing filaments with different characteristics, such as filaments with different colors (red, green, and blue, or cyan, magenta, and yellow, or black and white, or black, white, red, green, and blue), filaments with different sheens (shiny and matte), and different widths, though this is not required.

FIG. 1 illustrates 3D object 108, when complete, from a roughly isometric perspective 114. Filaments in the process of being applied to build 3D object 108 are shown with detailed plan perspectives 116 and 118. Detailed plan perspective 116 shows 3D object 108 in the process of being built with an outer filament 120 applied as a wave over an outer bound 122 of a surface of object 108. Detailed plan perspective 118 shows another outer filament 124 applied as a wave over outer bound 122 and also over, but out of phase (shifted by $\pi$), with outer filament 120.

Four side perspectives 126, 128, 130, and 132 are also shown; side perspective 126 shows an expanded and partial view of outer filament 120 and outer bound 122. Side perspective 128 shows an expanded and partial view of outer filaments 120 and 124, which are also shown above in plan perspectives.

Side perspective 130 shows a third outer filament 134 (also in black) but with the same phase as outer filament 124. Side perspective 132 shows a fourth outer filament 136 (in white) out of phase with the third outer filament 134 but in phase with outer filament 124. This is an example of a checkerboard pattern which, from a distance, will appear as a gradient between the filaments' colors, here gray as the filaments are white and black. This checkerboard will also have a woven fabric-like texture due to peaks of the various waves and the regular pattern, which permits a desired tactile feel, or varying luminosity, or both. Filaments in these side perspectives are shown blended with prior out-of-phase filaments and with a droop at their peaks to the prior in-phase filaments, though such blending and droop are overemphasized for ease of illustrating these effects.

As also can be seen with object 108, the techniques enable other gradients, including light gray 138, dark gray 140, as well as gray 142. These are three gradients shown for visual clarity, though a continuous gradient can also be created using the techniques. Object 108 is but one example of ways in which the techniques enable surface characteristics, and is shown simply as an introduction. The techniques enable other surface characteristics, which are described in greater detail below.

Figure 2:
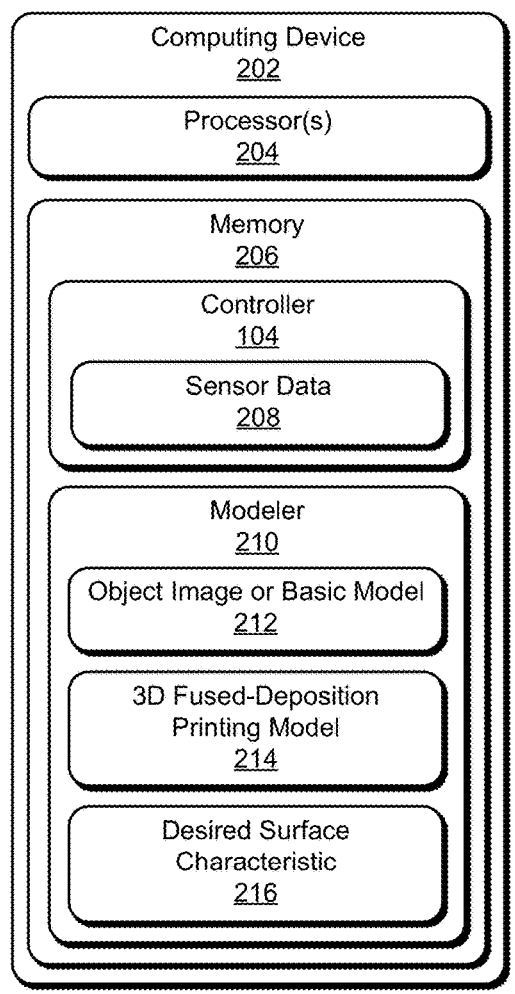
FIG. 2 illustrates a computing device having the controller of FIG. 1 along with a modeler and other elements usable by the techniques.

FIG. 2 is an illustration of a computing device 202 having an example embodiment of controller 104, as well as example elements usable by the techniques. Computing device 202 includes one or more processors 204 and computer-readable storage memory ("memory") 206. Memory 206 includes controller 104, which includes or has access to sensor data 208 (from sensors 112 of FIG. 1), and modeler 210. Controller 104 can control, and/or process data for, 3D printing device 102 effective to perform 3D printing with small geometric offsets to affect surface characteristics. In this example embodiment, controller 104 acts through control of filament-providing group 106 of FIG. 1.

Controller 104 optionally may also provide filaments at varying thicknesses, such as by causing filament-providing group 106 to speed up or slow down application of filaments. Further, filament-providing group 106 may be capable of heating material being extruded, thereby also enabling controller 104 to cause filament characteristics to be altered, including on-the-fly. These characteristics may include thickness/thinness, viscosity, and stiffness. By altering characteristics of the filament, controller 104 may control a flexibility of a multi-stage (or single stage) filament, which can affect a "droop" of the filament over prior filaments. Further, this control by controller 104 can be on-the-fly, such as based on sensor data 208 from sensors 112, thereby providing a feedback loop as to a filament characteristic, wave amplitude, wave phase, or structural soundness resulting from applied filaments.

Filament-providing group 106 may extrude filaments, such as continuously or with closely-spaced beads that, when placed, adhere to each other to create filaments. Filaments, however, are not necessarily extruded. Other manners of printing material may be used, including applying previously created filaments, such as from a spool of filament, as well as other manners known in the art for applying materials in 3D printing. Whether or not extruded, filament-providing group 106 may provide filaments having various characteristics, including sheen, color, size, and viscosity.

In some embodiments, controller 104 causes filament-providing group 106 to place filaments in non-planar layers, which may affect surface characteristics of horizontal surface areas, and will be described in greater detail below.

Controller 104 may also apply filaments at a precision greater than a width of the filaments in at least one dimension when providing filaments having a small geometric offset. In one example, assume that each stage of printing is performed in an [X, Y] plane, with each additional stage altering a Z dimension, in which case this precision is in the X or Y dimension. Furthermore, this precision can also operate in two or even all three of these dimensions, such as with applying filaments in waves having varying phases and amplitudes, layers of filaments provided in non-planar contours, offsets provided at angles relative to neighboring filaments or with sub-filament-width precisions, or filaments applied in curved shapes within a planar or non-planar stage.

Modeler 210 includes or has access to an object image or basic model 212, which provides data about an object desired to be printed. Modeler 210 creates 3D fused-deposition printing model 214 based on object image or basic model 212. Modeler 210 may determine or receive desired surface characteristic 216, which may be separate from object image or basic model 212, such as when text (e.g., alphanumeric) or a two-dimensional image is desired to be shown on a surface of object 108, or may be received or integral with object 108, such as when object 108 includes a colored surface.

More specifically, modeler 210 is capable of determining, based on a desired surface characteristic of a 3D object, a small geometric offset between portions of adjoining layers of a 3D fused-deposition printing model for the 3D object. These small geometric offsets are at outer bounds of the adjoining layers, where the outer bounds represent a modeled surface of the 3D object, though filaments may be provided offset from that modeled surface. These small geometric offsets, as will be described in detail below, can be created using a wave amplitude change, a filament displacement change (e.g., an inset from a prior outer bound), or a filament size change, or some combination of these. Small geometric offsets can be as little as a small fraction of a filament width to many filament widths, such as in cases where an amplitude of a filament applied in a wave is small enough relative to adjoining filaments to be offset (e.g., set back from, or set over, the peaks of the adjoining filaments) to be even multiple millimeters of offsets.

Figure 3:
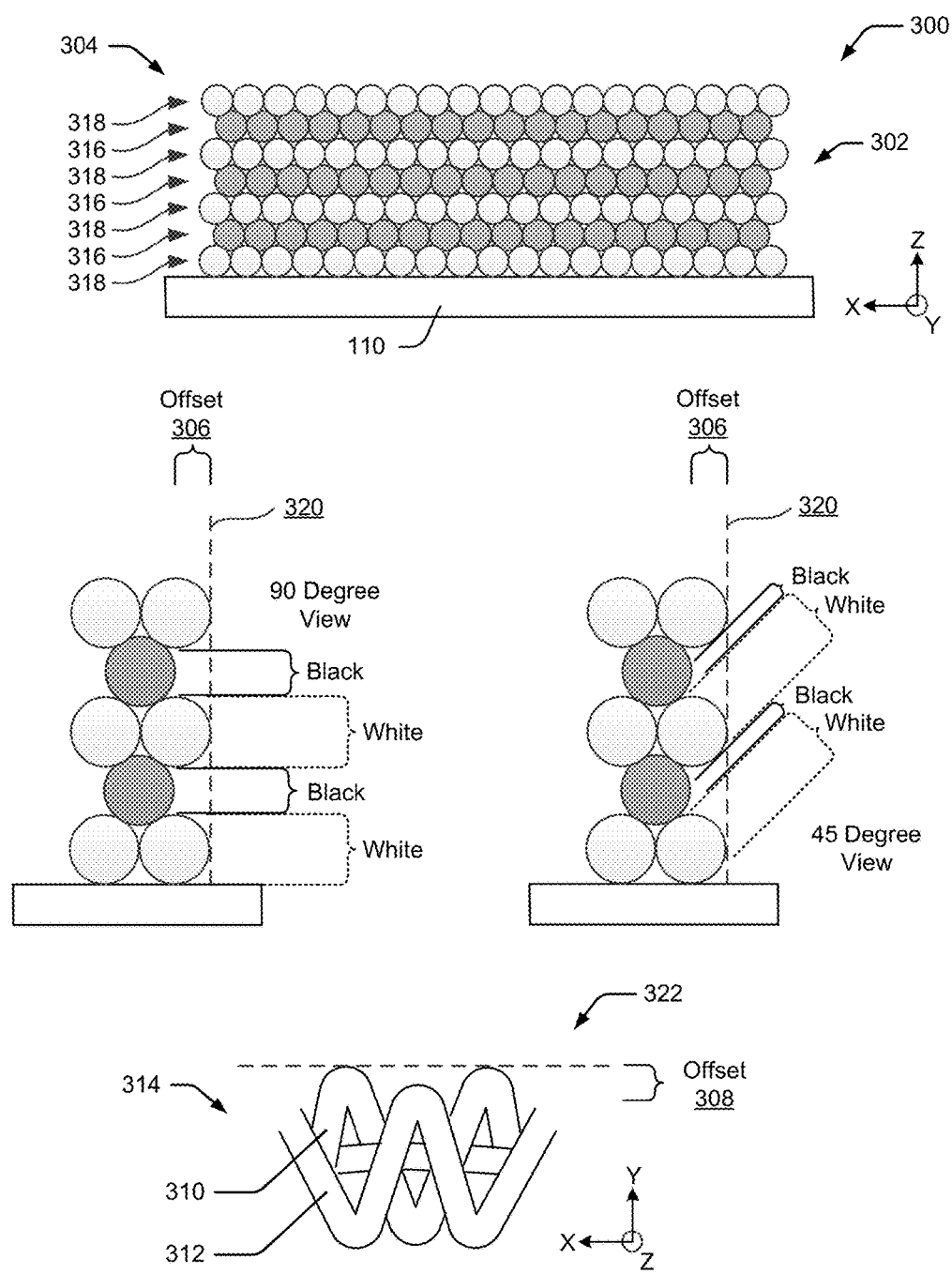
FIG. 3 illustrates two objects having small geometric offsets.

As an introduction to the concept of small geometric offsets, consider FIG. 3, which illustrates a side, cross-section view 300 (a cut along the X and Z plane of X, Y, Z) of surface 302 of object 304 (all on plate 110) that has a displacement offset 306, as well as wave amplitude offset 308 caused by waves 310 and 312 having amplitude differences for object 314.

For the cross-section view 300, note that this is a simplification and may not show some of the potential textures due to it being a cross section. Object 304 includes many layers of black filaments 316 and white filaments 318, with displacement offsets 306. These displacement offsets 306 are about one half of a filament width, often well under one millimeter, and sometimes well under one tenth of one millimeter. Notice that the viewing angle of a viewer relative to surface 302 dramatically affects the color gradient seen, which is due to the offset and not just the reduced amount of black directly viewable at 90 degrees. At some viewing angles black filaments 316 will be barely seen, such as the 45 degree view where less than 20 percent of the color seen is black, resulting in a very light gray. Looking directly at surface 302 (90 degree view), the amount of black visible to the viewer is roughly one third of the total, meaning that white will be seen at about 66% of surface 302, for a roughly 66% gradient of white versus black. Furthermore, this is also affected by ambient or direct light, such as in cases where shadows caused by the overhang of white filaments 318 further darkens the gradient. As noted above, this is one factor permitting a printer having only a single filament to still create, using the techniques, desired surface characteristics even including luminosity gradients. This particular example shows only one filament change per layer, though this is not required by the techniques. Modeled surface 320 is shown for later reference; black and white filaments 316 and 318 are shown not overhanging modeled surface 320, through this is permitted.

For the wave amplitude differences, which are shown in plan view 322, wave amplitude offset 308 is shown. Note that an amplitude change to wave 312 relative to wave 310 causes offset 308, though this can also be affected by moving wave 312 away from wave 310, reducing a filament width used for of wave 312, and in others noted herein.

Ways in which entities of FIGS. 1 and 2 act and interact are set forth in further detail below. While controller 104 and modeler 210 are shown separate and as computer-executable instructions executable by processor(s) 204, they may instead be hardware or firmware, or a combination of hardware, firmware, and/or software, and be integrated or separate.

Techniques for 3D Printing with Small Geometric Offsets

As noted above, the techniques enable 3D printing with small geometric offsets to affect surface characteristics. The following methods are described in part using entities and examples of FIGS. 1-3, though this is for example only.

Figure 4:
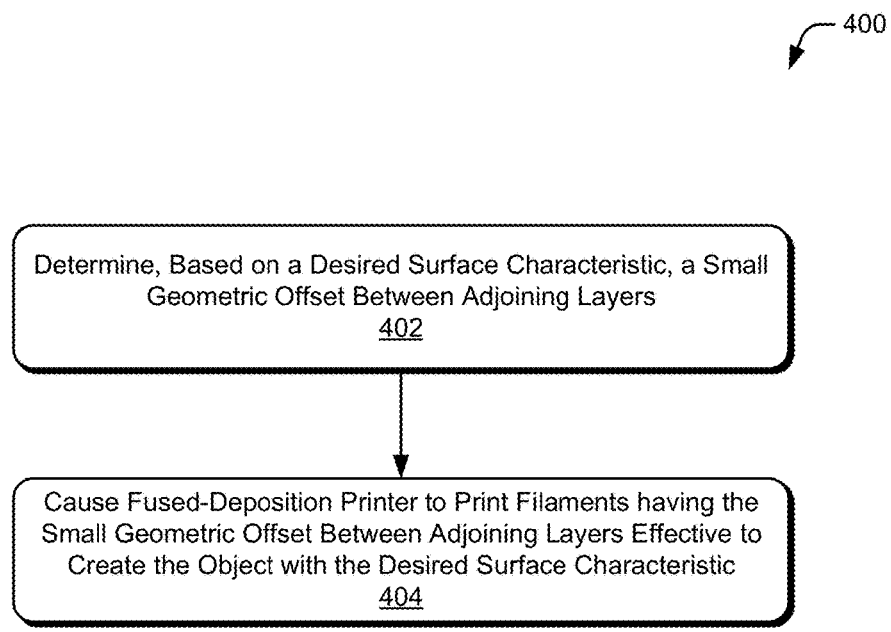
FIG. 4 illustrates example methods for 3D printing with small geometric offsets to affect surface characteristics.

FIG. 4 illustrates example methods 400 that enable 3D printing with small geometric offsets to affect surface characteristics. The techniques, at 402, determine, based on a desired surface characteristic of a 3D object, a small geometric offset between portions of adjoining layers of a 3D fused-deposition printing model for the 3D object. As noted, the geometric offset is at outer bounds of the adjoining layers, the outer bounds representing a modeled surface of the 3D object.

Figure 5:
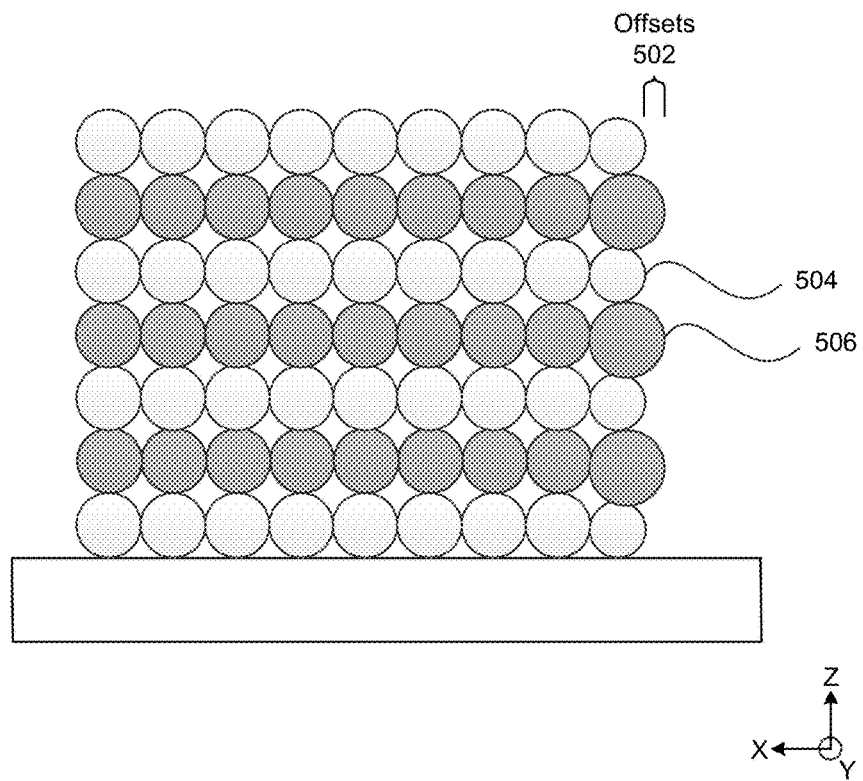
FIG. 5 illustrates offsets caused by reducing a size of an outer white filament and increasing a size of an outer black filament.

The techniques may determine geometric offsets to produce the desired surface characteristics in at least three manners, which may be used alone or in combination. In one case the techniques determine widths of filaments to apply to portions of adjoining layers. Thus, the techniques may determine to produce a particular offset by reducing the size of a filament to be printed at the outer bound, increasing a size of a filament to occlude or alter an offset of an adjoining layer's filament, or both. An example of this is shown in FIG. 5, which illustrates offsets 502 caused by reducing a size of an outer white filament 504 and increasing a size of an outer black filament 506, both size alterations relative to other filaments in the layer or relative to each other.

In another case, the techniques determine offsets through displacement of filaments relative to an adjoining layer. Thus, the techniques may determine to produce a particular offset by displacing a filament to be printed at an outer bound of a layer, thereby occluding an adjoining layer's filament. An example of this is shown in FIG. 3 above.

In a third case, the techniques determine offsets through determining an amplitude change of a filament applied as a wave relative to a prior-applied filament of the adjoining layers applied as a prior wave. An example of this is shown in FIG. 1 above, and various manners in which this is determined are described in later methods below. As noted in FIG. 1, use of waves produces various effects on the surface, including a checkerboard and a woven-fabric feel. The offset created at the surface does not necessarily require different-colored filaments to provide desired surface characteristics. Consider a case where filaments are applied having different sheens—this can be two filaments or with a single head altering a heat, speed of application, and so forth to provide different sheens and thus ability to reflect light. This magnifies the effect of the offset by occluding low-sheen filaments to provide a greater luminosity.

Also consider a case where a same filament is applied throughout the object. The techniques can determine an amplitude for waves of filament to vary the light reflect from the surface. Waves of similar amplitudes have a higher ability to reflect light than those with offsets (the wave peaks are generally exposed to light when of similar amplitudes and some are occluded when of different amplitudes), which allows for enough of a different that shading and even images, like words, can appear on the surface of the object.

In each of these cases the techniques, such as through modeler 210, can determine geometric offsets to enable colors and color gradients. Thus, if filament-providing element 106 includes three or more print heads that have three or more different-colored filaments, modeler 210 can determine small geometric offsets based on perceived colors created by combinations of proximate filaments having the three or more different colors. Thus, determining to apply a yellow and a red filament in adjoining layers creates an orange color, while determining to offset the yellow to be occluded by the red filament results in burnt orange or near-red color. This is but one example of the many colors that the techniques can determine thereby enabling desired surface colors.

Continuing methods 400, at 404 the techniques cause a fused deposition printer to print filaments with the small geometric offset between the adjoining layers. The techniques may do so where the printer includes two or more print heads, one print head capable of printing filaments with different characteristics (e.g., sheen and width), or even a single print head capable of printing a filament without varying its characteristics.

With the above cases set forth, the discussion now turns to an example manner in which the techniques may determine waves for application at an outer bound of an object model's surface. This example manner is not intended to be, and is not to be taken as a limitation on the techniques, as various manners for determining small geometric offsets may be used.

Example Methods for Determining Wave Characteristics

Figure 6:
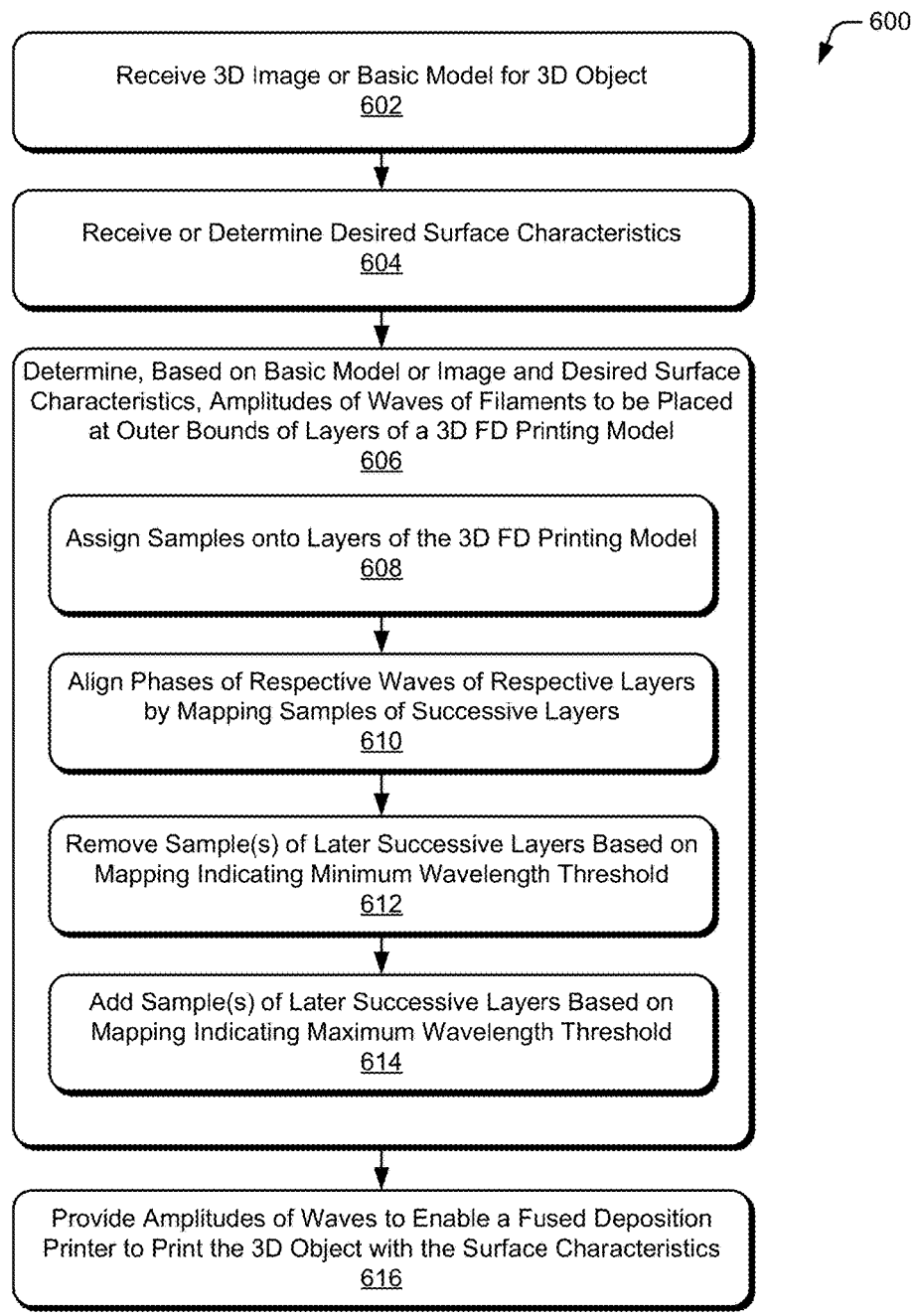
FIG. 6 illustrates example methods for determining wave characteristics for filaments to be applied to an outer bound of a printed 3D object.

FIG. 6 illustrates example methods 600 for determining wave characteristics for filaments to be applied to an outer bound of a printed 3D object.

At 602, the techniques receive a 3D basic model or image for a 3D object. This 3D basic model or image can be of various types, including various computer-readable models (e.g., computer-aided design (CAD) drawings), a fused-deposition driver-ready model that has not been processed by the techniques to create desired surface characteristics, or even images, such as pictures of a 3D object taken from different angles sufficient to determine the 3D object's dimensions, and so forth.

At 604, the techniques receive, or determine based on the 3D model or image for the 3D object, desired surface characteristics. The 3D image or basic model may include desired surface characteristics or modeler 210 may determine them.

Figure 7:
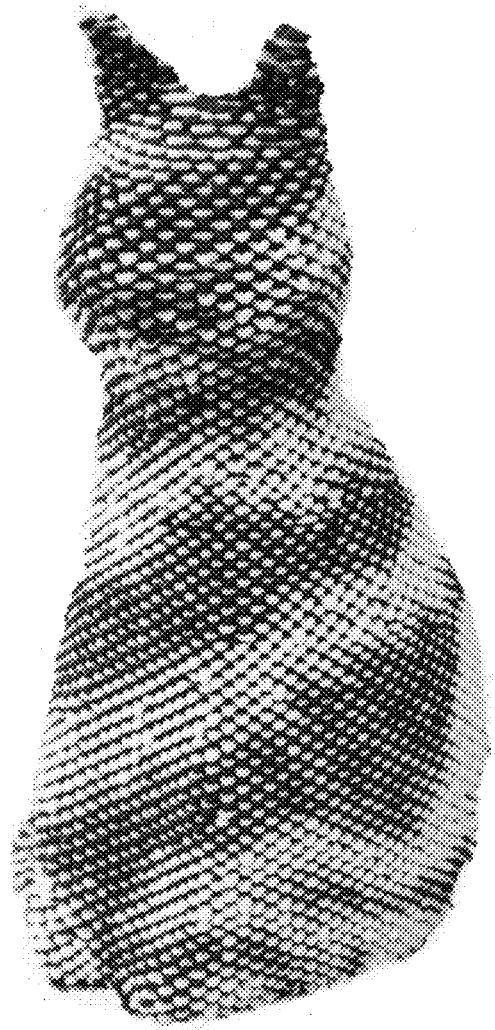
FIG. 7 illustrates a 3D object printed with an unassociated surface characteristic, namely a cat object printed with a desired surface characteristic of an image of a woman wearing a hat.

Thus, a 3D object not having any information about color, shading, texture and so forth may be received and modeler 210 may determine colors, textures and so forth either without input or based on other information, such as an image or colors desired, which may or may not be associated with the 3D object. As example of a 3D object and an unassociated surface characteristic is shown in FIG. 7. FIG. 7 shows a cat printed with the techniques where the desired surface characteristic is an image of a woman wearing a hat.

At 606, the techniques determine, based on the desired surface characteristic of the 3D object, amplitudes of waves of filaments to be placed at outer bounds of alternating layers or alternating sets of layers of a 3D fused-deposition printing model for the 3D object, the outer bounds representing a modeled surface of the 3D object. The techniques may also determine amplitudes based in part on characteristics of the printer and filament-providing element 106 intended to be used, filament characteristics, such as width and color, and so forth.

As noted in part above, these amplitudes are effective to causes small geometric offsets between some alternating layers or alternating sets of layers of a printed object, the small geometric offsets causing more or less light to be reflected off of the some of the alternating layers or alternating sets of layers. These small geometric offsets cause more or less light to be reflected even, in some cases, without changing filament materials or colors between the alternating layers or alternating sets of layers.

Characteristics of the filaments and environmental factors present during printing can affect the amplitude chosen, such as gravity or filament viscosity causing an amount of droop for filaments placed at outer bounds of the layers when over prior filaments where some portion of the filament hangs over or is otherwise not fully supported (except in cases where viscosity is very low). This droop is shown at droops 144 and 146 in FIG. 1. Droop increases the occlusion of the prior-applied filaments, and therefore is taken into account when determining amplitudes or other small geometric offsets, such as displacement offsets described above.

As noted at operation 604, the desired surface characteristic may be determined from an image separate from the 3D object. In such a case, modeler 210 determines the amplitudes effective to enable the fused deposition printer to create the image on the surface of the 3D object, such as is shown in FIG. 7. Also, the desired surface characteristic can be a color or color gradient, in which case modeler 210 may determine, at 606, amplitudes based on filament colors, such as based on a color intensity of the available filament colors, e.g., a brightness of a white filament, wavelengths of a red, green, and blue filaments, reflective characteristics of filaments (shiny to matte), and so forth.

Various alternative manners of determining the amplitudes of waves, as well as phases, phase matching, and adding and removing numbers of waves for layers, are shown within block 606. Here modeler 210 first, at 608, assigns samples onto layers of the 3D fused-deposition printing model, the samples representing peaks, valleys, or intersections of the waves at the outer bounds of each of the layers. This is illustrated with a cat model 800 shown in FIG.

8 and a base layer 802, which illustrates samples 804 with dots placed on outer bound 806. These samples represent the waves of filament that may be applied, including their phase. Here the samples mark intersections of the waves over outer bound 806, though peaks, valleys, or other representations can be used.

Thus, modeler 210, at 608, is capable, for a given 3D object and based on filament and/or layer widths, to slice the 3D object into a set of polygons $P_l$ where:

$$l \in [0, n-1]$$

Figure 8:
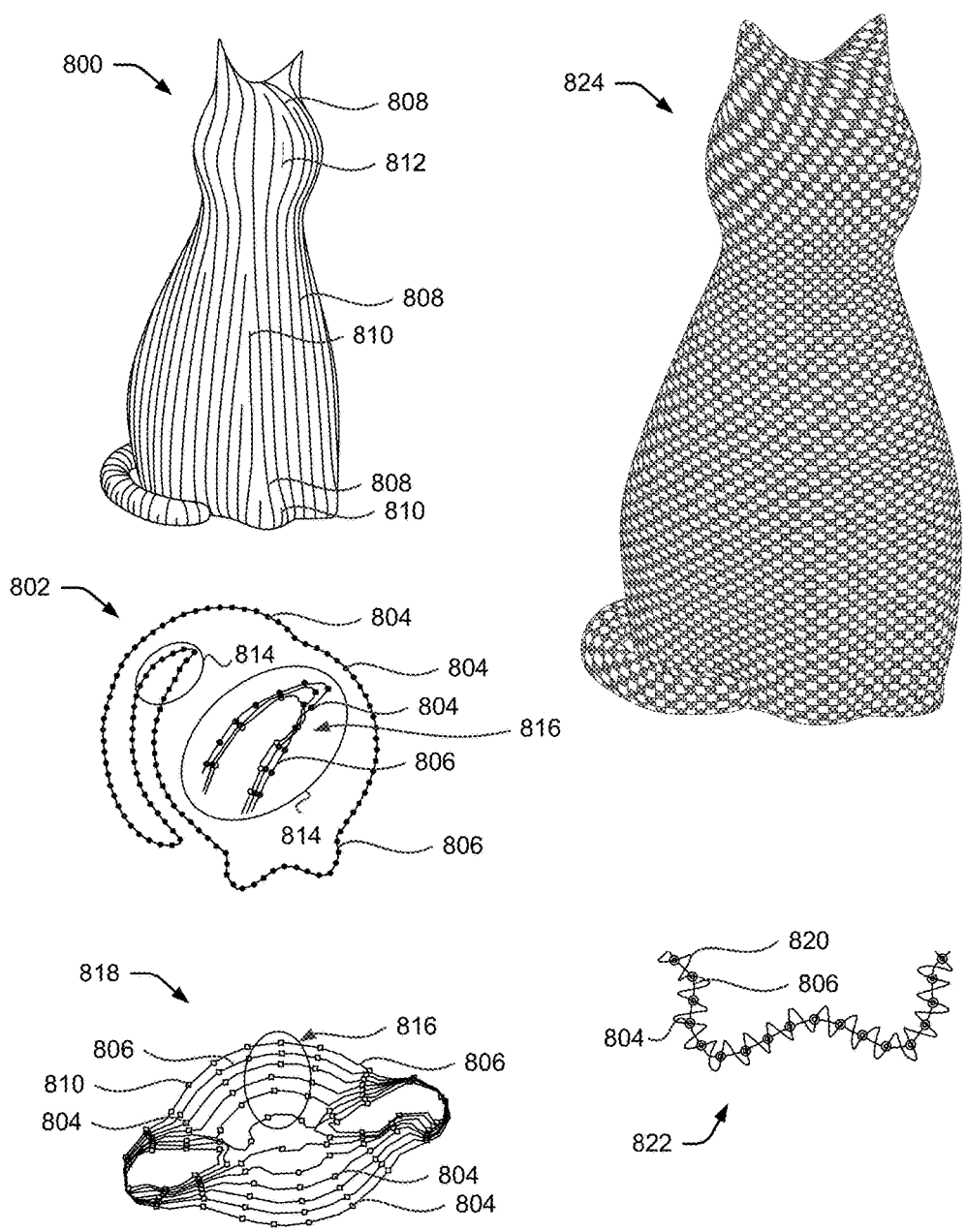
FIG. 8 illustrates a cat model having tracelines of samples and layers with samples shown as dots on an outer bound of slices of the model and a cat object printed using the model.

Therefore, modeler 210, with the $l^{th}$ slicing layer, starts at the bottom of the model, and proceeds upward. Here straight-line segments of each of these polylines are converted in high frequency sine waves with a near-constant wavelength $\lambda$. After two layers the sine waves are phase shifted by $\pi$. Thus, alternating sets of layers (each set having two layers) are phase shifted to produce the checkerboard pattern shown in FIG. 1. This is illustrated, as noted, with samples 804 in FIG. 8, here with each sample the same for two layers and then shifted for the next two layers, and thus each layer with marked samples is a set of alternating layers rather than a single layer of printed filament. Modeler 210, at 610, aligns phases of respective waves of respective successive layers by mapping the samples of the successive layers. At 612, modeler 210 removes one or more samples of a later one the successive layers relative to a prior one of the successive layers responsive to the mapping indicating that the sample is less than a minimum wavelength threshold from a neighboring sample.

At 614, modeler 210 adds samples to one or more other, later ones of the successive layers relative to another prior one of the successive layers responsive to the mapping indicating that two samples are separated by a distance larger than a maximum wavelength threshold. The addition of samples is performed between the two samples effective to reduce the distance to less than or equal to the maximum wavelength threshold.

Alternatively or additionally, the techniques may determine a relaxation of the samples of the later one of the successive layers, the relaxation altering a phase of, and locations of, the samples of the later one of the successive layers relative to the prior one of the successive layers effective to more-evenly space the samples. Modeler 210 may do so in part based on minimizing phase distortion with the samples of the prior one of the successive layers.

As noted, modeler 210 adds and removes samples, and thus portions of a wave of filaments at an outer bound of the layer or set of layers. The techniques can control the spacing and number of samples by so doing, thereby maintaining a nearly constant wavelength $\lambda$ for the waves. In more detail, this is done by a projection and relaxation of samples mapped on the layers.

Mathematically, the techniques may start with a base layer $P_0$, and then a number of samples for the various polygons is computed:

$$p^i \in P_0$$

and $k^i = [A(p_0^i)/\lambda]$, where $A(\cdot)$ is the arc length of $p^i_0$

These samples are then spaced as equally as practical, along $P^i_0$ by an arc length distance of:

$$A(p_0^i)/k^i$$

Then, with this initial sample assignment for the base layer, the techniques project (here add samples) and relax (here remove samples) on subsequent sets of layers until the top of the model for the 3D object is reached. Mathematically, this is represented by an already-sampled layer l, after which each sample:

$$s \in s^i_l$$

Which is then projected as $s^l$ onto the next set of layers unless the distance between s and $s^l$ is greater than a threshold. If it is, a sample is added, as described generally at operation 614. If less than a threshold, the sample is removed, as described generally at operation 612. This is illustrated with cat model 800 through tracelines on the outer bounds the cat model. Note tracelines 808 that end, which shows that a sample has been removed at endpoint 810. Note also tracelines 808 where a sample is added at startpoint 812.

Two examples of this are illustrated, a first for a tail section 814 showing samples for alternating sets of layers 816. Another example is illustrated for ears section 818 (enlarged to show detail of alternating sets of layers 816, samples 804, endpoint 810, and outer bound 806). With this complete, modeler 210 tessellates the outline in between samples with a sine pattern, shown at sine pattern 820 having samples 804, for a feet section 822 of cat model 800 along outer bound 806.

At 616, the techniques provide the amplitudes of the waves of the filaments effective to enable a fused deposition printer to print the 3D object having the desired surface characteristic. Providing the amplitudes of the waves may include other characteristics, and may be provided to remote printers, such as through a 3D fused-deposition printing model usable by a remote printer driver, for example. The example cat model 800 is provided to a dual-tone, black-and-white filaments, fused-deposition printer resulting in printed cat 824. Here a checkerboard pattern surface characteristic is produced, the checkerboard showing effects of filament lines 808 and phase shifting, but without amplitude changes to the waves of filaments, as amplitude changes would obscure the effects of operation 608, 610, 612, or 614.

Addressing Horizontal Surfaces

Alternatively or in addition to the above methods, the techniques may address horizontal surfaces, as these surfaces can create challenges for fused-deposition printers. In some cases the techniques determine a printing orientation having fewer horizontal surface planes and reduce the number, size, or likely presentation angle of these horizontal surfaces. The techniques may do so by altering an original orientation at which the object is to be presented using the model created. Thus, if less of the object will have horizontal areas when printed on its side or at 45 degrees, etc., the techniques may do so.

Figure 9:
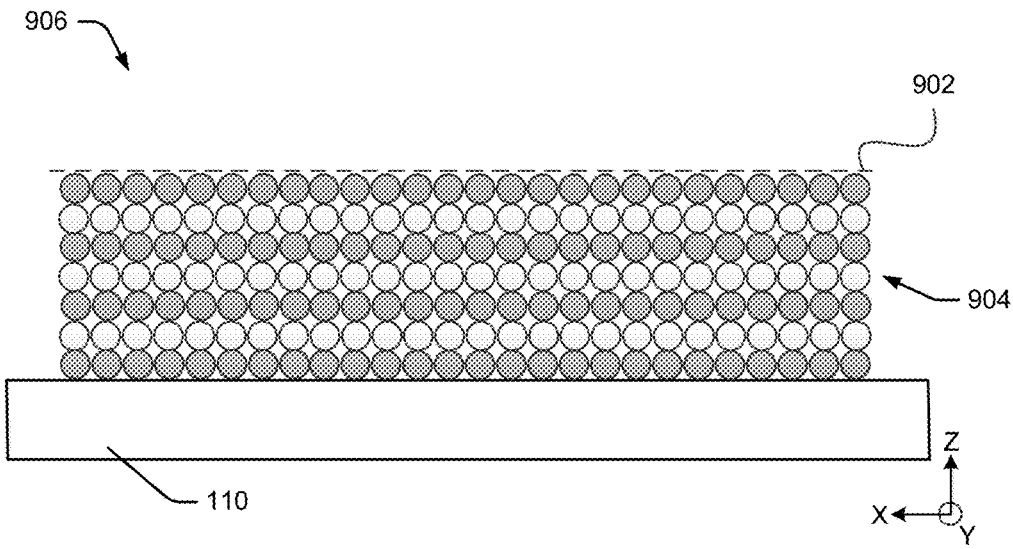
FIG. 9 illustrates a projected horizontal surface of an object along with an example manner in which the techniques create a model such that layers are printed leaving a depression into which other layers are printed within the depression to correct horizontal-area artifacts.
Figure 9:
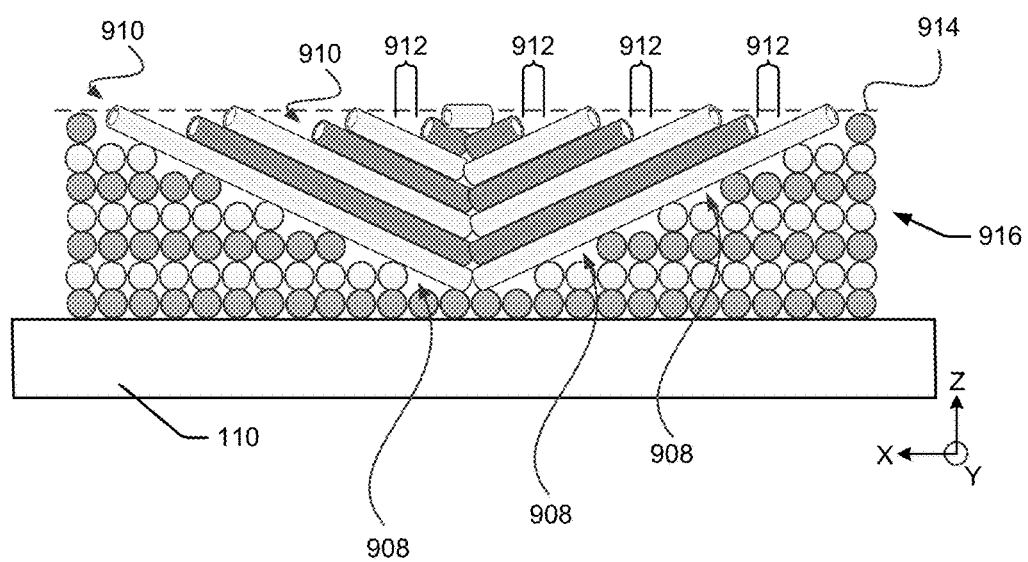

In addition to, or alternatively with, printing the object with an altered orientation, the techniques may correct for potential artifacts in a horizontal surface plane by leaving a depression under the horizontal surface plane and filling the depression with concave layers. This is effective to provide multiple layer edges at the horizontal surface plane. To do so, the techniques leave a depression under the horizontal surface and then print non-planar layers within the depression effective to create alternating layers at the horizontal surface. This is illustrated in FIG. 9, which shows a projected horizontal surface 902 of object 904 on plate 110, show in cross-sectional view 906. The techniques create the model such that the layers are printed leaving a depression 908 and then layers 910 are printing as concave layers within the depression 908. Note that these layers may be printed following the various manners described above, such as with small geometric offsets 912. In this case small geometric offsets 912 enable the horizontal surface 914 to be printed to show a greater amount of white filament than black, thereby resulting in a light-grey color for new object 916.

For visual simplicity, the above illustrations show filaments as long strings or columns with circular cross sections. These filaments, however, may have other structures, or be softened, or be subject to later processing thereby altering their structure (e.g., sintering ceramic filaments to improve strength). Whether idealized as long columns with circular cross sections or otherwise, the techniques are capable of building 3D objects with desired surface characteristics.

System-on-Chip

Figure 10:
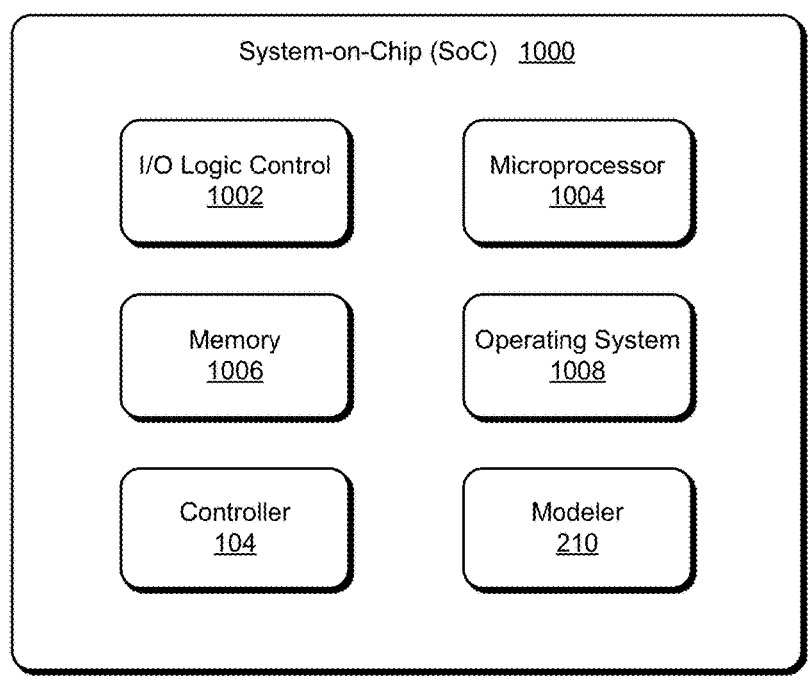
FIG. 10 illustrates a System-on-Chip (SoC) environment for implementing embodiments of the techniques described herein.

FIG. 10 illustrates a System-on-Chip (SoC) 1000, which can implement various embodiments described above. An SoC can be implemented in a fixed or mobile device of various types. SoC 1000 can be integrated with electronic circuitry, a microprocessor, memory, input-output (I/O) logic control, communication interfaces and components, other hardware, firmware, and/or software needed to run an entire device (e.g., 3D printing device 102). SoC 1000 can also include an integrated data bus (not shown) that couples the various components of the SoC for data communication between the components. A device that includes SoC 1000 can also be implemented with many combinations of differing components.

In this example, SoC 1000 includes various components such as an input-output (I/O) logic control 1002 (e.g., to include electronic circuitry) and a microprocessor 1004 (e.g., any of a microcontroller or digital signal processor). SoC 1000 also includes a memory 1006, which can be any type of random access memory (RAM), a low-latency nonvolatile memory (e.g., flash memory), read only memory (ROM), and/or other suitable electronic data storage. SoC 1000 can also include various firmware and/or software, such as an operating system 1008, which can be computer-executable instructions maintained by memory 1006 and executed by microprocessor 1004. SoC 1000 can also include other various communication interfaces and components, wireless LAN (WLAN) or PAN (WPAN) components, other hardware, firmware, and/or software.

SoC 1000 includes controller 104 and/or modeler 210, which may include various components of FIG. 2 as well. Controller 104 and modeler 210 in SoC 1000, either independently or in combination with other entities, can be implemented as computer-executable instructions maintained by memory 1006 and executed by microprocessor 1004 to implement various embodiments and/or features described herein, such as 3D printing with small geometric offsets or creating models enabling printers to print with small geometric offsets. Controller 104 or modeler 210 may also be provided integral with other entities of the SoC. Alternatively or additionally, controller 104, modeler 210, and the other components can be implemented as hardware, firmware, fixed logic circuitry, or any combination thereof that is implemented in connection with the I/O logic control 1002 and/or other signal processing and control circuits of SoC 1000.

Although the subject matter has been described in language specific to structural features and/or methodological operations, the subject matter defined in the appended claims is not necessarily limited to the specific features or operations described above, including orders in which the operations are performed.

What is claimed is:

1. A method comprising:
   determining, based on a desired surface characteristic of a 3D object, amplitudes of waves of filaments to be placed at outer bounds of alternating layers or alternating sets of layers of a 3D fused-deposition printing model for the 3D object, the outer bounds representing a modeled surface of the 3D object; and
   providing the amplitudes of the waves of the filaments effective to enable a fused deposition printer to print the 3D object having the desired surface characteristic.

2. The method of claim 1, wherein providing the amplitudes is effective to cause small geometric offsets between some of the alternating layers or alternating sets of layers, the small geometric offsets causing more or less light to be reflected off of the some of the alternating layers or alternating sets of layers.

3. The method of claim 2, wherein the small geometric offsets causes more or less light to be reflected without changing filament materials or colors between the alternating layers or alternating sets of layers.

4. The method of claim 1, wherein the surface characteristic is an image separate from the 3D object, and wherein determining the amplitudes and providing the amplitudes is effective to enable the fused deposition printer to create the image on the surface of the 3D object.

5. The method of claim 1, wherein the desired surface characteristic is a texture having a tactile feel and the filaments to be placed at the outer bounds of the alternating layers or alternating sets of layers of the 3D fused-deposition printing model have a same color and sheen.

6. The method of claim 1, further comprising, prior to determining the amplitudes of the waves of the filaments, receiving a 3D model or image for the 3D object and determining the 3D fused-deposition printing model based on the 3D model or image, the determining the 3D fused-deposition printing model including determining layers of the 3D fused-deposition printing model of which the alternating layers or alternating sets of layers are included.

7. The method of claim 6, wherein the layers are determined based on a filament width of a filament head of a 3D fused-deposition printer to which the amplitudes are provided.

8. The method of claim 6, wherein determining the 3D fused-deposition printing model includes determining a printing orientation having fewer horizontal surface planes or a small area of horizontal surface than an original orientation of the object of the 3D model or image.

9. The method of claim 6, wherein determining the 3D fused-deposition printing model corrects a horizontal surface plane by leaving a depression under the horizontal surface plane and filling the depression with concave layers effective to provide multiple layer edges at the horizontal surface plane.

10. The method of claim 1, wherein determining the amplitudes is further based on a droop characteristic of the filaments, the droop characteristic caused by gravity causing an amount of droop on one or more filaments to be placed at the outer bounds of the alternating layers.

11. The method of claim 1, further comprising:
   assigning samples onto layers of the 3D fused-deposition printing model, the samples representing peaks, valleys, or intersections of the waves at the outer bounds of each of the layers;
   aligning phases of respective waves of respective successive layers by mapping the samples of the successive layers;
   removing a sample of a later one the successive layers relative to a prior one of the successive layers responsive to the mapping indicating that the sample is less than a minimum wavelength threshold from a neighboring sample; and adding a sample to another later one of the successive layers relative to another prior one of the successive layers responsive to the mapping indicating that two samples are separated by a distance larger than a maximum wavelength threshold, the adding the sample being added between the two samples effective to reduce the distance to less than or equal to the maximum wavelength threshold.

12. The method of claim 11, the operations further comprising determining a relaxation of the samples of the later one of the successive layers, the relaxation altering a phase of, and locations of, the samples of the later one of the successive layers relative to the prior one of the successive layers effective to more-evenly space the samples.

13. The method of claim 12, wherein determining the relaxation of the samples is also based on minimizing phase distortion with the samples of the prior one of the successive layers.

\* \* \* \* \*